May 9, 1933.  M. NOPPER  1,907,437
MOTION PICTURE CAMERA
Filed Dec. 10, 1931
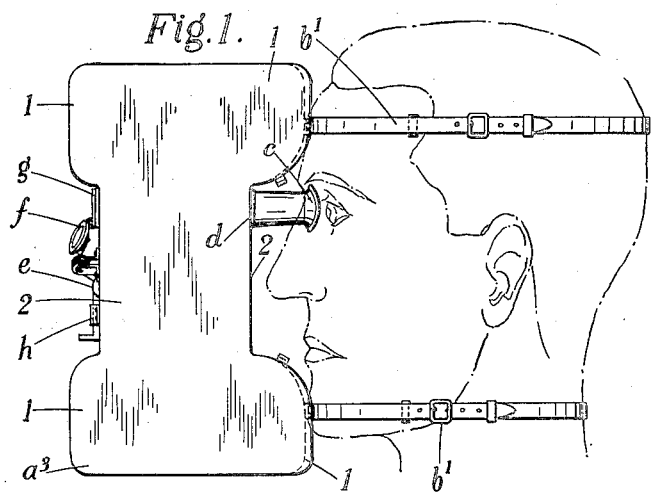
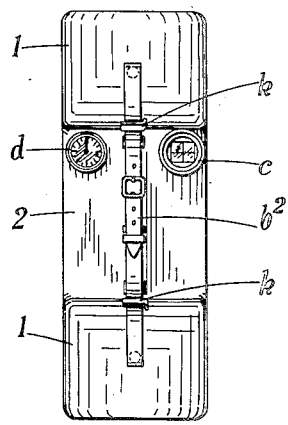
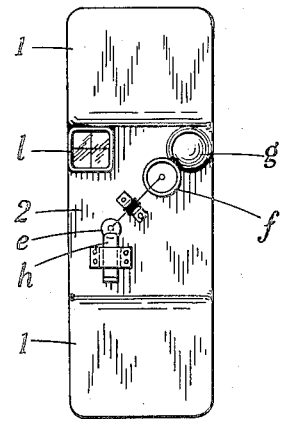
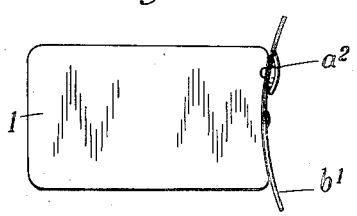
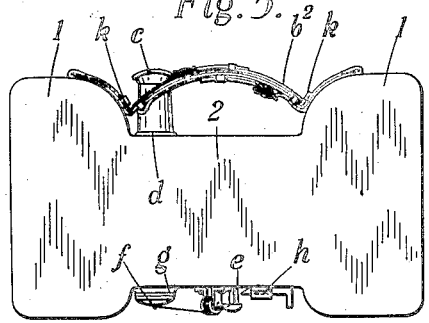
INVENTOR
Max Nopper
BY
ATTORNEY Patented May 9, 1933

1,907,437

UNITED STATES PATENT OFFICE

MAX NOPPER, OF FURTWANGEN, GERMANY

MOTION PICTURE CAMERA

Application filed December 10, 1931, Serial No. 580,081, and in Germany September 2, 1930.

This invention relates to improvements in motion picture cameras, and has for its object the provision of such a camera which affords, without the use of a tripod, vibration free exposure, easy accessibility of the operating mechanism, safe and simple mounting of the optical and like members, convenient and compact accommodation of the driving mechanism and also a simplified construction of the housing of the apparatus itself.

This object is attained according to the invention by constructing the camera in a special form consisting in projecting portions and receding portions, whereby delicate and valuable parts are not mounted in recesses in the housing as in known apparatus, but the form of the housing itself affords the necessary protection for these parts. Further, carrying members attached to the apparatus are provided which act as fixing members by being slung round the head of the operator during exposures, instead of employing a tripod. By the building of the finder itself into the housing, in addition to a simplified construction, a particularly compact and handy form of the apparatus is obtained.

The accompanying drawing shows by way of example, a constructional form of the subject of the invention and in particular:

Fig. 1 shows the motion picture camera in position for exposing,

Fig. 2 is an elevation of the end of the camera which is turned towards the face of the operator, Fig. 3 is an elevation of the objective end of the camera, Fig. 4 is a plan of the camera, Fig. 5 is a schematic view of the apparatus in position for carrying.

As Fig. 1 clearly shows, the form of the apparatus consists in projecting parts 1 and receding parts 2 and is so chosen that the apparatus can be attached to the head of the operator by means of adjustable fixing members $b^1$, which can also act as a carrier, so as to ensure a steady support and vibration free exposure without the use of a tripod. The finder or finders built into the apparatus itself and also the film counting mechanism as far as possible then lie at the level of the eyes. The special shape of the apparatus then affords an easy gripping of the same by its receding part with one hand and consequently a simple and vibrationless operation of the release member $e$. The projecting optical parts, such as, for example, the objective and the finder are likewise arranged in the recessed part of the apparatus, that is to say, in the wall of the housing itself, and are thus protected against damage without the necessity of providing special recesses for these parts, which complicate the manufacture of the housing itself and the tools used in the manufacture. In addition to the simplified manufacture of the housing, the omission of the recesses also affords an easy accommodation of the necessary film carrying mechanism.

Fig. 2 shows an elevation of the end of the housing which is turned towards the face of the operator, with the hooks or rings $k$ of the fixing members which act as carrier $b^2$, the finder $c$ and the film sight counter $d$.

Fig. 3 shows the objective side with the finder $l$, a possible construction of the light shutter member $f$ in the open position, the objective $g$ and the release member $e$ operated by the catch $h$.

Fig. 4 is a plan of the apparatus showing the faces $a^2$ on the upper part of the apparatus adapted to fit the head of the operator.

Fig. 5 shows the apparatus in the carrying position with the fixing members $b^1$ employed as a carrying member, together with the catch $h$, the release member $e$ and the light shutter $f$ in their initial position.

The mode of operation is as follows:

After loosening the carrying member $b^2$ from the rings or hooks $k$ the apparatus is set up on end by means of these fixing members $b^2$ which are placed round the head and neck of the operator, in such a way that the shaped surfaces $a^2$ fit snugly to the chin and forehead respectively and the finder and counter are on a level with the eyes. The left hand serves to support the apparatus by the face $a^3$. The right hand grips the receding portion of the apparatus and after sighting the object to be taken the release $e$ is operated with one or more fingers of the right hand and the light shutter $f$ thereby brought into a position in which the light can enter the objective $g$. When the pressure of the release ceases, a spring, for example, brings the light shutter back in front of the objective so that the light can no longer reach it.

I claim:

1. A motion picture camera, comprising in combination: a housing having a recess in the middle portion of its front wall and a second recess in the middle portion of its rear wall; an objective arranged in the first named recess; a light shutter member in the first named recess co-operating with said objective; a finder in the first named recess co-operating with said objective for positioning the image; a sight on said finder located in the second recess; and a film counter arranged in the second recess.

2. A motion picture camera, comprising in combination: a housing having a recess in the middle portion of its front wall, and a second recess in the middle portion of its rear wall adapted to accommodate the projecting part of the operator's face when the camera is held against the head; an objective in the first named recess; a finder in the first named recess co-operating with said objective for positioning the image and having a sight located in the second recess; and a film counter arranged in the second recess.

3. In a motion picture camera, the combination of: a housing having a recess in the middle portion of its rear wall adapted to accommodate the projecting portion of the operator's face when the camera is held against the head; a view finder in said housing having a sight located in said recess; and a film counter arranged in said recess.

4. A motion picture camera comprising in combination: a housing having a recess in the middle portion of its front wall and a second recess in the middle portion of its rear wall; an objective arranged in the first recess; exposure means arranged in the first recess and co-operating with said objective; a view finder co-operating with said objective to position the image and having a sight located in the second recess; and a film counter arranged in the second recess; all said members in the recesses being arranged therein without projecting beyond the plane passing through the unrecessed part of the front wall of the camera.

5. A motion picture camera, comprising in combination: a housing having a front wall and a rear wall each provided with a recess in its middle portion and projecting parts adjacent thereto; an objective arranged in the recess of the front wall; a light shutter arranged in the recess of the front wall and co-operating with said objective; a release member arranged in the recess of the front wall and co-operating with said light shutter; a view finder in the recess of the front wall co-operating with said objective to position the image; a sight on said view finder located in the recess of the rear wall; and a film counter arranged in the recess of the rear wall, the projecting parts of the rear wall being of suitable width and shape to rest snugly against the operator's forehead and chin respectively when the camera is held against his head; and all said members in the recesses being arranged therein without projecting beyond the plane passing through the projecting parts of the walls.

6. A motion picture camera, comprising in combination: a housing having a front wall and a rear wall each provided with a recess in its middle portion and projecting parts adjacent thereto; an objective arranged in the recess of the front wall; a light shutter arranged in the recess of the front wall and co-operating with said objective; a release member arranged in the recess of the front wall and co-operating with said light shutter; a catch member operating said release member; a view finder in the recess of the front wall co-operating with said objective to position the image; a sight on said view finder located in the recess of the rear wall; and a film counter arranged in the recess of the rear wall, the projecting parts of the rear wall being of suitable width and shape to rest snugly against the operator's forehead and chin respectively when the camera is held against his head; and all said members in the recesses being arranged therein without projecting beyond the plane passing through the projecting parts of the walls.

7. A motion picture camera, comprising in combination: a housing having a front wall and a rear wall each provided with a recess in its middle portion and projecting parts adjacent thereto; an objective arranged in the recess of the front wall; a light shutter arranged in the recess of the front wall and co-operating with said objective; a release member arranged in the recess of the front wall and co-operating with said light shutter; a catch member operating said release member; a view finder in the recess of the front wall co-operating with said objective to position the image; a sight on said view finder located in the recess of the rear wall; a film counter arranged in the recess of the rear wall; and means for carrying and holding the camera in position attached to the rear wall of said housing, the projecting parts of the rear wall being of suitable width and shape to rest snugly against the operator's forehead and chin respectively when the camera is held against his head; and all said members in the recesses being arranged therein without projecting beyond the plane passing through the projecting parts of the walls.

In testimony whereof I affix my signature.

MAX NOPPER.